United States Patent [19]

Koshida et al.

[11] 4,279,932

[45] Jul. 21, 1981

[54] EDIBLE LAMINAR SHEET MATERIAL AND METHOD OF PREPARATION

[75] Inventors: Daikichi Koshida, Toyonaka; Ko Sugisawa; Takashi Kimura, both of Nara; Setsuo Nakajima, Yamatotakada, all of Japan

[73] Assignee: House Food Industrial Company Limited, Osaka, Japan

[21] Appl. No.: 32,705

[22] Filed: Apr. 23, 1979

[51] Int. Cl.³ .............................................. A23L 1/00
[52] U.S. Cl. ....................................... 426/89; 426/92; 426/94; 426/93; 426/104; 426/103; 426/274; 426/272; 426/552; 426/557; 426/564; 426/568; 426/618; 426/629; 426/643; 426/647
[58] Field of Search ..................... 426/89, 92–94, 426/103, 104, 144, 249, 272, 274, 275, 383, 502, 512, 516, 455, 465, 272, 552, 557, 564, 568, 618, 629, 643, 647; D1/1, 99

[56] References Cited

U.S. PATENT DOCUMENTS

| | | | |
|---|---|---|---|
| 2,278,466 | 4/1942 | Musher | 426/89 |
| 3,499,766 | 3/1970 | Vollink et al. | 426/559 |
| 3,851,084 | 11/1974 | Rossen et al. | 426/249 |
| 3,969,539 | 7/1976 | Sumner et al. | 426/104 |

FOREIGN PATENT DOCUMENTS 2856195  6/1979  Fed. Rep. of Germany ........... 426/557

Primary Examiner—Joseph M. Golian
Assistant Examiner—Elizabeth A. Hatcher
Attorney, Agent, or Firm—Kurt Kelman

[57] ABSTRACT

A food product comprising a laminar sheet material comprising two edible sheets of different swelling properties, the two edible sheets being bonded together along at least a portion of the surfaces of the sheets. At least one of the sheets is capable of swelling and being deformed in water, and the laminar sheet material is so deformed.

12 Claims, 18 Drawing Figures

EDIBLE LAMINAR SHEET MATERIAL AND METHOD OF PREPARATION

The present invention relates to edible laminar sheet materials and a method of preparing the same. More particulary, this invention relates to novel dehydrated instant foods and a method of preparing the same.

Various dehydrated porous food products having excellent reconstitution capability have been developed. This known food products do not deform during reconstitution in water and the reconstituted products remain unchanged in shape and size, or the products swell in size but retain their original shape.

The invention provides a laminar sheet material comprising at least two edible sheets of different swelling properties in water, the two edible sheets being bonded together along at least a portion of the surfaces of the sheets, at least one of the edible sheets being capable of swelling in water, and the laminar sheet material being deformed. Preferably, the two edible sheets are dehydrated and the product is an instant food which may be swollen and deformed in water during reconstitution into a different shape from that of the original edible sheets.

According to another aspect of the present invention, there is provided a method of preparing a laminar sheet material, comprising the step of adhering two edible sheets of different swelling properties in water along at least a portion of the surfaces of the sheets, at least one of the edible sheets being capable of swelling and being deformed in water.

The two edible sheets of different swelling properties in water may be adhered together with an edible adhesive along suitable portions of the surfaces of the sheets, such as egg white, sodium alginate, potassium alginate, carboxymethyl cellulose, carrageenan, xanhan gum, guar gum, gum arabic and tamarind gum.

Alternatively, if at least one of the edible sheets is of a pasty consistency, the sheets may be adhered by steaming or drying. If this does not suffice to bond the sheets sufficienty, an edible adhesive may be applied between the sheets. If steamed together, the laminated sheets are then dried. Before lamination, the sheets may be dried, partially dried or not dried at all, suitable edible adhesives may be applied at selected spots on one of the sheets or over its entire surface and the other sheet may then be placed thereover, the laminar sheet then being dried.

The edible sheets may be dried by hot air, microwave heating and freeze drying, or any combination of these drying methods may be used. One of the sheets may not swell at all or not substantially in water during reconstitution of the laminar sheet, the laminar sheet material being deformed when immersed in water to form a curved body oriented in the direction of the sheet of lower swelling property.

The different swelling properties of the edible sheets in water are indicated by the ratio of the volumes of the sheets after reconstitution in water to that of the volumes before reconstitution. The laminar sheet material comprising at least one dehydrated edible sheet may be reconstituted in hot or even cold water wherein at least one of the sheets swells and the laminar sheet material forms a curved body bending in the direction of the sheet with the lower swelling property.

If these edible laminar sheet materials are used in connection with dehydrated instant foods, such as instant noodles or instant rice, they may be reconstituted into foods of fancy shapes by immersing them in hot water containing a desired seasoning, such as sucrose, table salt, soy sauce, monosodium glutamate and spices used to improve the taste and flavor of the food.

These edible laminar sheet materials may also be used in soups, stews or juice, and they may be incorporated in jellied foods containing decorative ingredients suitable for infant foods.

The edible sheets useful for the laminar sheet material of the present invention may be made from various edible mixtures including, for example, whole eggs, powdered eggs, flour, natural starch, processed starch, fish paste, sweetenings, seasonings and foaming agents, such as baking powder, with sufficient water to make a paste, if required, and by drying the pasty mixture into a porous dehydrated sheet, if desired.

The sheets of different swelling properties in water include porous bodies containing different amounts of foaming agent and may include dehydrated foods which swell only slightly or not at all in water, such as ham, boiled fish paste and dried bean curds.

The above and other objects, advantages and features of this invention will become more apparent from the following detailed description of certain now preferred embodiments, taken in conjunction with the accompanying drawing wherein FIG. 1 is a perspective view of a laminar dehydrated instant food having the shape of a flower, before reconstitution;

Figure 1:
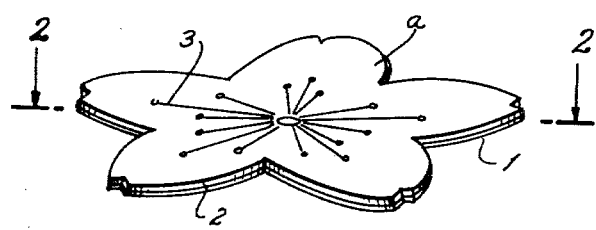
Figure 2:
FIG. 2 is a sectional view along line 2—2 of FIG. 1.

Referring now to the drawing and first to FIGS. 1 to 4, two edible sheets 1 and 2 were prepared from the pastes described in Example 1 hereinbelow, the sheets were placed in a mold of floral shape and steamed together in a manner more fully described in Example 1. Decorative pattern 3 was branded on one surface with a hot branding iron, preferably while the sheet to be branded is not yet dried or only half dried to make the pattern clearer. Afterwards, the laminated sheets were dried to form the illustrated laminar sheet.

Figure 3:
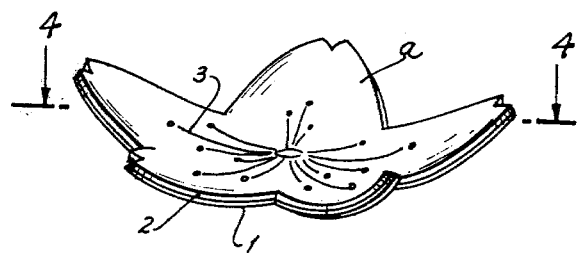
FIG. 3 shows the food of FIG. 1 after reconstitution in water.
Figure 4:
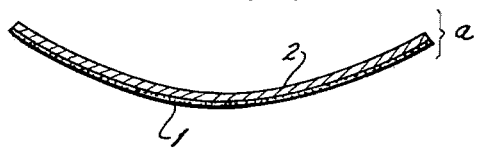
FIG. 4 is a sectional view along line 4—4 of FIG. 3.

After drying, the laminar sheet was removed from the mold and since the swelling property of sheet 1 was higher than that of sheet 2, the laminar sheet material assumed the curved form shown in FIGS. 3 and 4 after immersion in water to reconstitute the dehydrated food. In this shape, it looked like a real flower.

Figure 7:
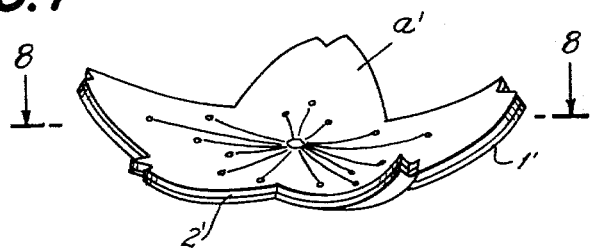
FIG. 7 shows the food of FIG. 5 after reconstitution in water.
Figure 8:
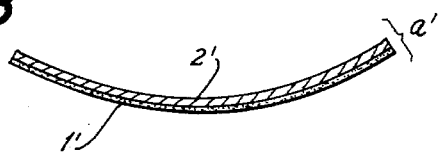
FIG. 8 is a sectional view along line 8—8 of FIG. 7.
Figure 9:
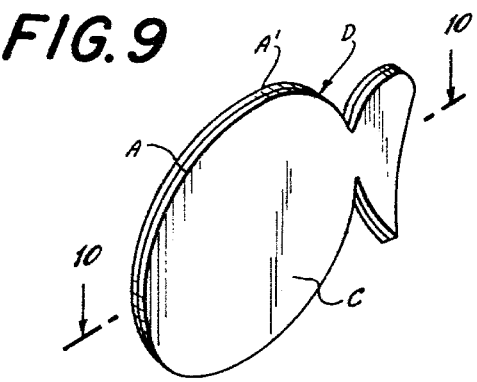
FIG. 9 is a perspective view of a laminar food having the shape of a fish, before reconstitution.
Figure 10:
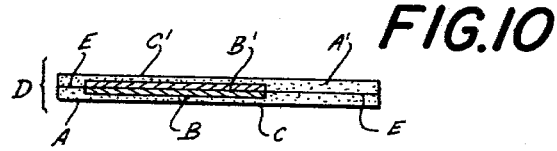
FIG. 10 is a sectional view along line 10—10 of FIG. 9.

Referring to FIGS. 5 to 8, edible sheets 1' and 2' are shaped in a mold to produce bodies with five petals forming the shape of bursting buds and, since the swelling property of sheet 1' was lower than that of sheet 2', the laminar sheet, on immersion in water, is so deformed that the petals curve downwardly to form a flower in bloom, as shown in FIG. 7. If the sheets have high swelling properties, the swollen petals curve downwardly rapidly on reconstitution in water, due to the weight of the swollen petals, and the petals may droop.

EXAMPLE 1

Six hundred and fifty grams of whole fresh egg, 35 g lactose, 100 g dextrin, 50 g potato starch, 5 g foaming agent (baking powder) and 160 g seasoning (80 g sugar, 40 g table salt, 20 g MSG and 20 g soy sauce) were whipped in a mixer to make a foamy paste A for edible sheet 1. Paste B for edible sheet 2 was prepared from the same mixture but omitting the foaming agent.

Paste A was poured into a mold having the shape of a booming flower (see FIG. 1) to produce a sheet of one millimeter thickness and paste B was poured thereover to a sheet thickness of 3 mm. The two sheets were in surface contact with each other in the mold, with the sheet materials at the interface between the two pasty sheets mixing slightly. The mold was then placed on a belt conveyor and passed through a tunnel filled with steam whereby the mixture foaming the two laminated sheets are coagulated to solidify them into a laminar sheet material. Afterwards, the laminar sheet material was subjected for about three minutes to heating by 2 KW microwave. The whole eggs in the pastes are coagulated by heating so that the sheets are plastic enough to be shaped like omelets in the mold and dehydrated to a moisture content of about 15% with hot air at a temperature of about 60° C.

Figure 5:
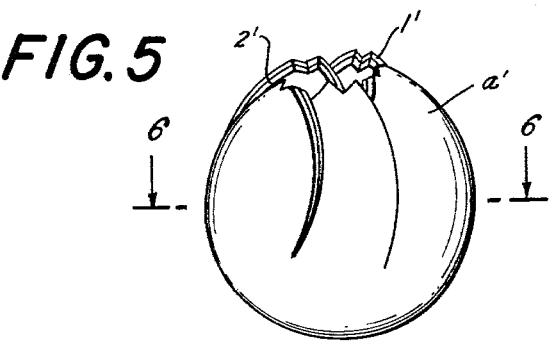
FIG. 5 is a perspective view of a laminar dehydrated instant food having the shape of a bursting flower bud, before reconstitution.
Figure 6:
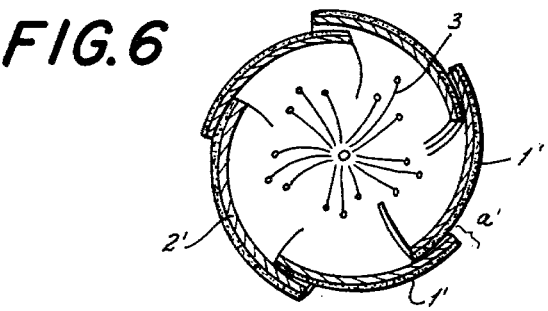
FIG. 6 is a sectional view along line 6—6 of FIG. 5.

To arrive at the shape of a bursting bud, as shown in FIG. 5, the heated laminar sheet materials were placed into a semi-spherical molding retainer with small holes and covered with another, somewhat larger molding retainer to form the shape of a bud. In this double-walled mold, the laminar sheet materials were dried with hot air at a temperature of 60° C. for one hour. When reconstituted in hot water for two and a half minutes, the reconstituted food had the appearance of a blooming flower (see FIG. 7).

EXAMPLE 2

Five hundred and seventy grams of whole fresh egg, 130 g fish paste (prepared by separating the bones, internal organs and skin from the fish meat and then grinding the raw fish meat), 40 g baking powder, 190 g potato starch and 70 g seasoning were whipped in a mixer to produce a foamy, porous paste.

The paste was poured into a mold having the shape of a flower to form a sheet of about 2 mm thickness, heated for three minutes by 2 KW microwave and dried with hot air for an hour to form dehydrated sheet 1.

Boiled fish paste of one millimeter thickness was cut into the same shape as sheet 1 and was dried with hot air at 60° C. for two hours to obtain dehydrated sheet 2 independently.

Egg white was applied to sheet 1 and sheet 2 was placed thereover, and the laminated sheets were dried with hot air for 15 minutes at 60° C. to obtain a dehydrated laminar instant food having the shape of a flower. The laminar sheet material swelled in hot water in about 15 seconds into the shape of a blooming flower, as shown in FIG. 3, and the instant food was adequately reconstituted in the water in about three minutes.

EXAMPLE 3

The dehydrated instant food D in the shape of a fish (FIGS. 9 to 12) was prepared from the following pastes:

Paste A was a foamed mixture of 570 g whole egg, 130 g fish plate, 20 g baking powder, 190 g potato starch and 70 g seasoning.

Ham was sliced into sheets of one millimeter thickness and the sheets were dried independently with hot air for two hours at 60° C. to prepare dehydrated food sheet B.

Dehydrated food sheet B was placed in the trunk part of a fish-shaped retainer, the size of the food sheet being a little smaller than that of the retainer trunk, paste A was poured over food sheet B and was spread to form a sheet of two and a half millimeter thickness. The laminated sheets were heated for three minutes with 2 KW microwave to obtain an edible dehydrated laminar sheet material C.

Sheet materials C were used for the left and the right side of the fish-shaped food. If the shape of the upper part of the fish is not the same as that of the lower part, a sheet C' is prepared for one side of the fish, laminar sheet material C' consisting of sheets A' and B' (which are of the same food as sheets A and B). The laminar sheet materials C and C' are removed from their retainers, and the two laminar sheet materials are superposed so that sheets B and B' are in contact with each other (see FIG. 10).

An aqueous solution of sodium alginate was applied at interface E between sheets A and A' at the tail part of the fish-shaped food and the circumference of the trunk part outside of B and B'. The laminate was heated for an hour at 60° C. to obtain laminar instant food D.

Figure 11:
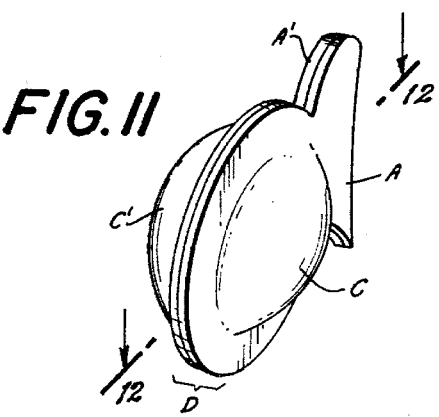
FIG. 11 shows the food of FIG. 9 after reconstitution in water.
Figure 12:
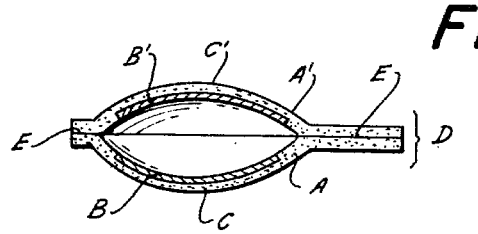
FIG. 12 is a sectional view along line 12—12 of FIG. 11.

When this instant food was dipped in hot water, the trunk part of the fish-shaped food swelled outwardly to form the fish shape shown in FIGS. 11 and 12 since inside sheets B and B' were not bonded to each other and the swelling property of A and A' was higher than that of B and B'. Food D was adequately reconstituted in three minutes.

EXAMPLE 4

Figure 13:
FIG. 13 is a perspective view of a circular edible sheet, before reconstitution.
Figure 14:
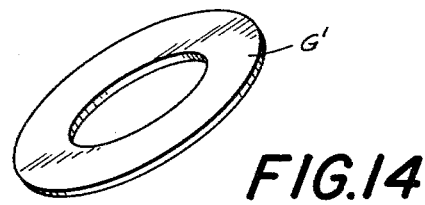
FIG. 14 is a like view of an annular edible sheet.
Figure 15:
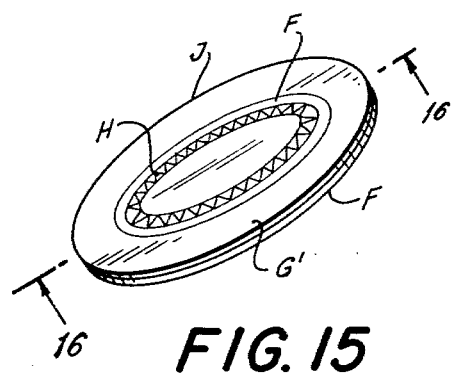
FIG. 15 is a perspective view showing a laminar sheet consisting of the sheets of FIGS. 13 and 14 adhered together.
Figure 16:
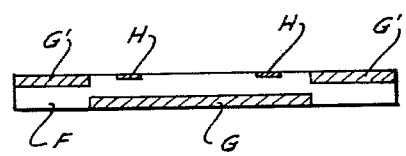
FIG. 16 is a sectional view along line 16—16 of FIG. 15.

Referring to FIGS. 13 to 18, the following procedure was followed:

Circular edible sheet G and annular edible sheet G', as shown in FIGS. 13 and 14, were prepared by cutting the sheet of dehydrated food B of Example 3. Circular sheet G was placed in the center of a disc-shaped retainer mold and foamy paste F (same as paste A of Example 3) was poured on sheet G and spread in the retainer to a sheet thickness of 3.5 mm. Annular sheet G' was then placed on paste F, as shown in FIGS. 15 and 16, and the laminar sheet material was heated for three minutes with 2 KW microwave to obtain laminar sheet material J. Decorative pattern H was branded by a hot branding iron on dried sheet F, as shown in FIGS. 15 and 16.

Figure 17:
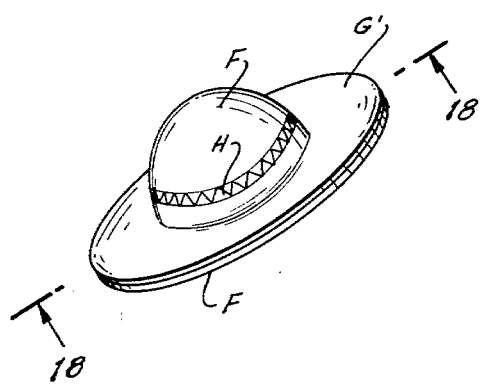
FIG. 17 shows the laminar food of FIG. 15 after reconstitution in water.
Figure 18:
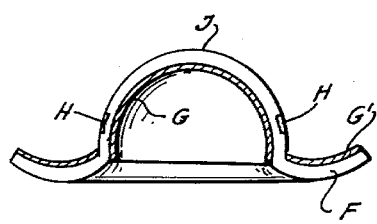
FIG. 18 is a sectional view along line 18—18 of FIG. 17.

When the dehydrated laminar sheet material J was dipped in hot water, the central portion thereof swelled and curved upwardly while the portion bonded to annular sheet G' curved downwardly, as shown in FIGS. 17 and 18, to form the shape of a hat with a crown and an annular brim. The time required to deform the laminar sheet material into the shape of a hat was about five minutes.

For the purpose of making laminar food products which will deform in the described manner on immersion in water, it is sufficient for the laminar sheet material to have two bonded sheets of different swelling properties in water and neither one of the sheets need to be dehydrated. However, if the products are instant foods reconstituted in water, wherein one of the sheets is a dehydrated layer to make prolonged storage possible, it will be useful to dehydrate the other sheet, too, to impart long storage life to the laminar product. The moisture content of the dehydrated product will differ according to storage requirements and other considerations in the art of instant foods and will usually be about 15% or less. On reconstitution in water, the dehydrated laminar sheet material will usually have a moisture content of about 50%.

The laminar sheet material of the invention is used mainly as an additive to dehydrated noodles. If the laminar sheet is dehydrated it has a long storage life. The noodles and the laminar sheet material are reconstituted together in hot water.

If one of the edible sheets consists of dehydrated ham or dehydrated boiled fish paste, such sheet will not significantly swell in water but if a sheet laminated therewith is capable of swelling in water, the laminar sheet so formed will be deformed in water.

What we claim is:

1. A method of preparing a laminar sheet material deformable in water comprising the step of adhering at least two edible sheets of different swelling properties in water along at least a portion of the surfaces of the sheets, at least one of the edible sheets being capable of swelling in water and at least one of the edible sheets being dehydrated.

2. The method of claim 1, wherein the dehydrated edible sheet contains a foaming agent.

3. A method of preparing a laminar sheet material deformable in water, comprising the step of adhering at least two edible sheets of different swelling properties in water along at least a portion of the surfaces of the sheets by an adhesive selected from the group consisting of egg white, sodium alginate, potassium alginate, carboxymethyl cellulose, carrageenan, xanthan gum, guar gum, gum arabic and tamarind gum, at least one of the edible sheets being capable of swelling in water.

4. A method of preparing a laminar sheet material deformable in water, comprising the step of adhering at least two edible sheets of different swelling properties in water along at least a portion of the surfaces of the sheets by steaming or drying, at least one of the edible sheets being of a pasty consistency and at least one of the edible sheets being capable of swelling in water.

5. A method of preparing a laminar sheet material deformable in water, comprising the steps of adhering at least two edible sheets of different swelling properties in water along at least a portion of the surfaces of the sheets, at least one of the edible sheets being capable of swelling in water, and deforming the laminar sheet material by placing the material in water for a period of time sufficient to impart a desired shape thereto.

6. The method of claim 5, wherein the water is hot and contains a seasoning.

7. The laminar sheet material deformable in water and comprising at least two edible sheets of different swelling properties in water, the two edible sheets being bonded together along at least a portion of the surfaces of the sheets, at least one of the edible sheets being capable of swelling in water and at least one of the edible sheets being dehydrated.

8. The laminar sheet material deformable in water and comprising at least two edible sheets of different swelling properties in water, an adhesive bonding the two edible sheets together along at least a portion of the surfaces of the sheets, at least one of the edible sheets being capable of swelling in water and the adhesive being selected from the group consisting of egg white, sodium alginate, potassium alginate, carboxymethyl cellulose, carrgeenan, xanthan gum, guar gum, gum arabic and tamarind gum.

9. The laminar sheet material of claim 7 or 8, wherein the two sheets are capable of swelling and being deformed in water.

10. The laminar sheet material of claim 7, further comprising an adhesive adhering the two edible sheets together.

11. The laminar sheet material of claim 7, wherein at least one of the edible sheets is of a pasty consistency and the sheets are adhered together autogenously.

12. The laminar sheet material of claim 7 or 8, wherein the sheet material is deformed in water to form a curved body oriented in the direction of the sheet of lower swelling property.

* * * * *